(12) United States Patent
Forlenza et al.

(10) Patent No.: US 7,865,842 B2
(45) Date of Patent: Jan. 4, 2011

(54) INSTANT MESSAGING REAL-TIME BUDDY LIST LOOKUP

(75) Inventors: Randolph M. Forlenza, Austin, TX (US); John P. Kaemmerer, Pflugerville, TX (US); Raghu Kalyanaraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/181,417

(22) Filed: Jul. 14, 2005

(65) Prior Publication Data

US 2007/0016878 A1    Jan. 18, 2007

(51) Int. Cl.
*G06F 3/00* (2006.01)

(52) U.S. Cl. .................. 715/816; 715/758

(58) Field of Classification Search ......... 715/816–817, 715/780, 752, 758, 968, 811, 812, 814; 709/206, 709/207, 224; 707/3, 10
See application file for complete search history.

(56) References Cited

U.S. PATENT DOCUMENTS

| | | | |
|---|---|---|---|
| 6,677,968 B1* | 1/2004 | Appelman | 715/853 |
| 6,750,881 B1* | 6/2004 | Appelman | 715/733 |
| 7,181,497 B1* | 2/2007 | Appelman et al. | 709/206 |
| 2002/0023132 A1* | 2/2002 | Tornabene et al. | 709/205 |
| 2004/0031058 A1* | 2/2004 | Reisman | 725/112 |
| 2004/0196315 A1 | 10/2004 | Swearingen et al. | 345/804 |
| 2005/0038856 A1 | 2/2005 | Krishnasamy | 709/206 |
| 2005/0050472 A1* | 3/2005 | Faseler et al. | 715/734 |
| 2005/0080859 A1 | 4/2005 | Lake | 709/206 |
| 2005/0086211 A1 | 4/2005 | Mayer | 707/3 |
| 2005/0132296 A1* | 6/2005 | Milic-Frayling et al. | 715/745 |
| 2005/0216563 A1* | 9/2005 | Stewart et al. | 709/206 |
| 2006/0031560 A1* | 2/2006 | Warshavsky et al. | 709/232 |
| 2006/0085515 A1* | 4/2006 | Kurtz et al. | 709/207 |
| 2006/0168204 A1* | 7/2006 | Appelman et al. | 709/224 |
| 2006/0176283 A1* | 8/2006 | Suraqui | 345/169 |
| 2007/0061753 A1* | 3/2007 | Ng et al. | 715/816 |
| 2007/0128899 A1* | 6/2007 | Mayer | 439/152 |
| 2007/0157122 A1* | 7/2007 | Williams | 715/816 |
| 2008/0059607 A1* | 3/2008 | Schneider | 709/218 |

\* cited by examiner

*Primary Examiner*—Steven P Sax
(74) *Attorney, Agent, or Firm*—Yee & Associates, P.C.; William H. Steinberg; Rudolf O. Siegesmund

(57) ABSTRACT

The invention disclosed is a computer program for displaying one or more entries from a buddy list. The computer program receives a partial input in a text entry field and displays a result set in a result field, wherein the result set comprises entries from the buddy list having data that matches the partial input.

3 Claims, 3 Drawing Sheets

| USER NAME | REAL NAME | GROUP |
|---|---|---|
| FABLE | FRANK ABEL | B |
| ⋮ | ⋮ | ⋮ |
| JBROWN | JACK BROWN | A |
| JDEERE | JOHN DEERE | A |
| JOHNQ | JOHN Q | B |
| JOHNCO | JOHNABLE CO. | C |
| JOHNINC | JOHNAHAN INC. | C |
| ⋮ | ⋮ | ⋮ |
| BWALSH | BOB WALSH | B |

INSTANT MESSAGING REAL-TIME BUDDY LIST LOOKUP

FIELD OF THE INVENTION

The present invention is related to graphical user interfaces for managing contact lists in an instant messaging application. The invention includes subject matter wherein a user's interaction with a computer system causes the computer to perform a partial input lookup and present a list of contacts based upon the partial input.

BACKGROUND OF THE INVENTION

Demand-based messaging is a communication service that allows users to exchange message data, such as text, over a network or other communications media, in real time. Probably the most common medium for exchange is the Internet, but as wireless phone networks continue to expand, their popularity for text messaging is also expanding. Instant Messaging (IM) is perhaps the most widely known and used embodiment of demand-based messaging. Today, most network and online service providers offer some form of IM service.

IM users typically use a networked computer and IM client software to exchange messages with one another in conversational style. An IM client provides an interface for users to compose, send, receive, and read text messages. Examples of IM clients that are popular today include IBM's SameTime, MSN Messenger, and Yahoo/AOL Instant Messenger. Web-based interfaces are also gaining popularity.

In a graphical display, an IM client usually provides several windows, through which a user can compose and read messages. IM clients generally provide some facility for managing lists of contacts, particularly other IM users. These lists are referred to colloquially as "buddy lists." See, e.g., U.S. Pat. No. 6,750,881 (issued Jun. 15, 2004). It is common practice to organize such lists into groups of related users, wherein the IM client displays the various groups in a hierarchical tree that can be collapsed and expanded as the user desires.

It is also common, though, for a user to amass rather large buddy lists. The number of groups also tends to expand steadily over time. Conventional buddy list management facilities quickly become inadequate for organizing such large lists. As a result, individual buddy list entries often are duplicated inadvertently in different groups. Thus, there is a need for an improved buddy list management interface that allows an IM user to dynamically identify duplicate entries before adding a new entry.

SUMMARY OF THE INVENTION

The invention is a computer program for displaying one or more entries from a buddy list. The computer program receives a partial input in a text entry field and displays a result set in a result field, wherein the result set comprises entries from the buddy list having data that matches the partial input.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "buddy list lookup" program.

Figure 1:
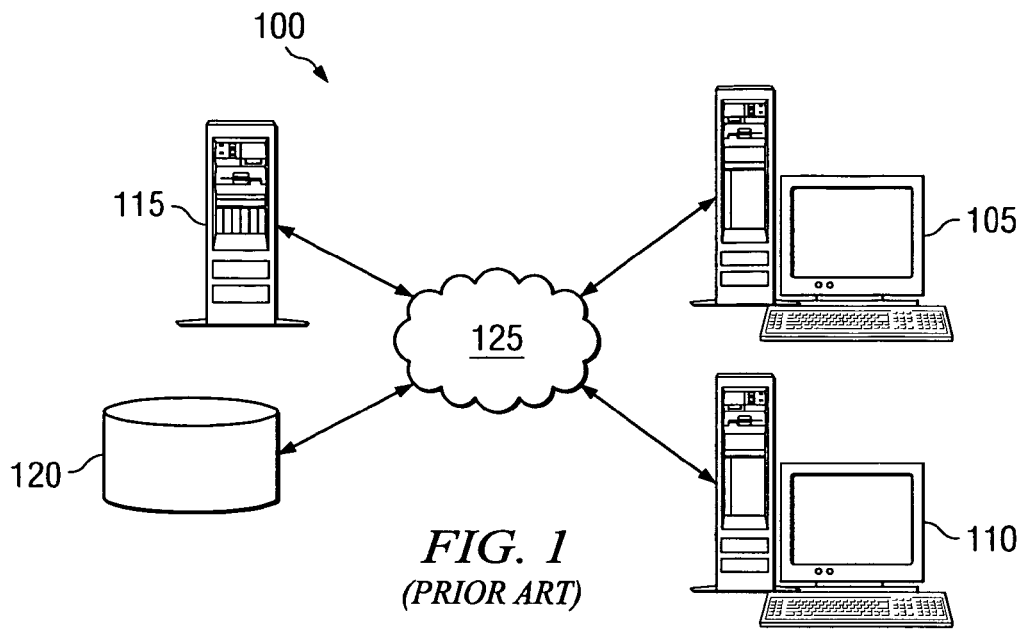
FIG. 1 illustrates an exemplary network of hardware devices in which the present invention can be practiced.

Additionally, the buddy list lookup program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
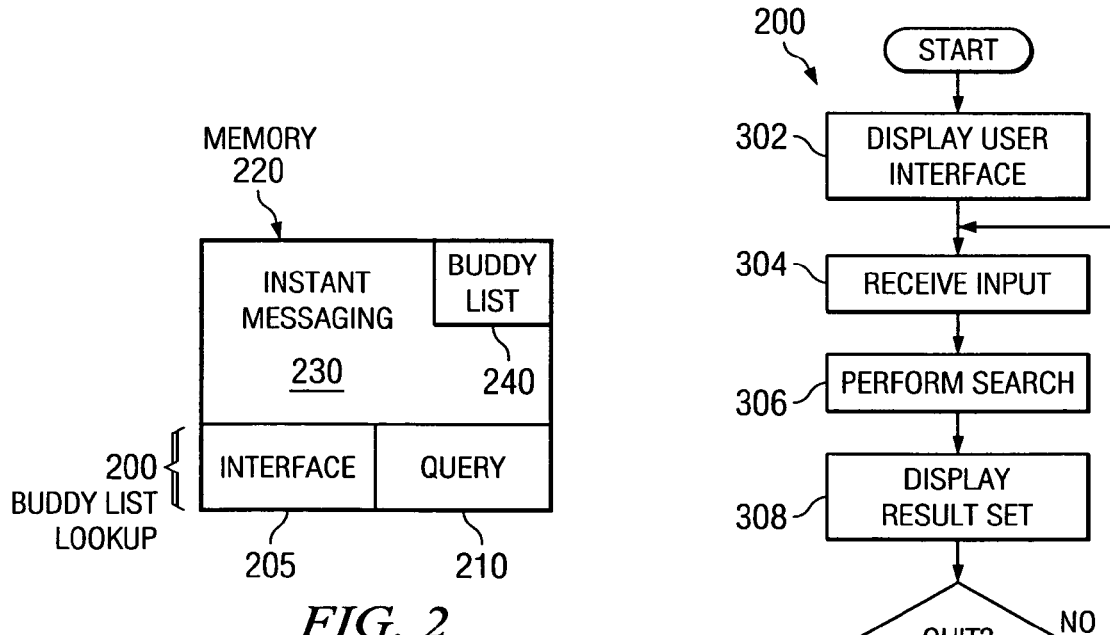
FIG. 2 is a schematic of a memory having components of the present invention stored therein.

Buddy list lookup program 200 and its components, interface program 205 and query program 210, typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media and network nodes. Thus, FIG. 2 is included merely as a descriptive expedient and does not necessarily reflect any particular physical embodiment of memory 220. As depicted in FIG. 2, though, memory 220 may include additional data and programs. Of particular import to buddy list lookup program 200, memory 220 may include instant messaging (IM) program 230 and buddy list 240, with which buddy list lookup program 200 interacts. IM program 230 represents any demand-based messaging software that provides an interface through which a user can access a messaging service and exchange messages with other users. Buddy list 240 represents any data source (including without limitation a file, table, or database) that identifies one or more users of the messaging service. In practice, buddy list 240 often is integrated with and managed by IM program 230, but also may exist independently.

Figure 3:
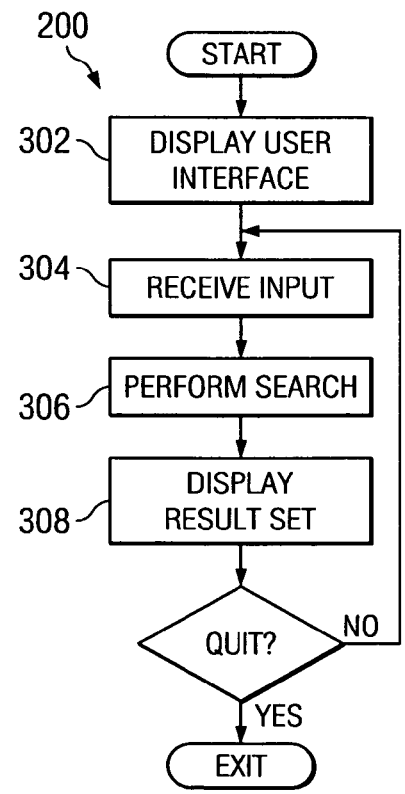
FIG. 3 is a flowchart of an embodiment of the present invention.
Figures 4, 5:
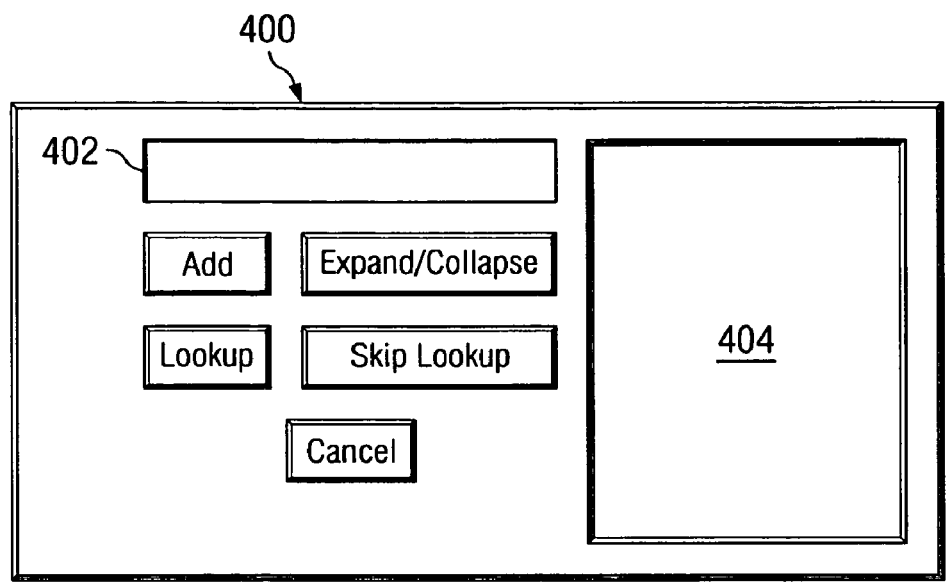
FIG. 4 illustrates an exemplary graphical user interface to the present invention.
FIG. 5 represents a fictional data source for the present invention.

FIG. 3 is a flowchart of buddy list lookup program 200. As indicated in FIG. 3, when a user activates buddy list lookup program 200, interface program 205 displays a user interface (302). FIG. 4 illustrates an exemplary graphical user interface (GUI) 400, including text entry field 402 and result field 404. The discussion that follows refers to GUI 400 for descriptive purposes, but a simple command line interface also is compatible with buddy list lookup program 200. After the interface program displays the user interface (302), the user can enter data (304) into text entry field 402. Buddy list lookup program 200 then activates query program 210 to process the data entered in text entry field 402. In the embodiment illustrated in FIG. 3, query program 210 is activated each time the user enters a new character in text entry field 402, but buddy list lookup program 200 also could be modified to activate query program 210 only when there is a pause in data entry. When activated, query program 210 compares each entry (306) in buddy list 240 with the partial input from text entry field 402, and returns a result set to buddy list lookup program 200. Buddy list lookup program 200 then passes the list of matching entries to interface program 205, which displays the result set (308) in result field 404. The result set comprises entries from buddy list 240 that match, at least partially, the partial input from text entry field 402. The data that the user enters in text entry field 402 is referred to here as "partial" input because the user can subsequently enter additional data to refine the data displayed in result field 404. As FIG. 3 illustrates, buddy list lookup program 200 will call query program 210 to process the additional data and interface program 205 to update result field 404.

Figure 6A:
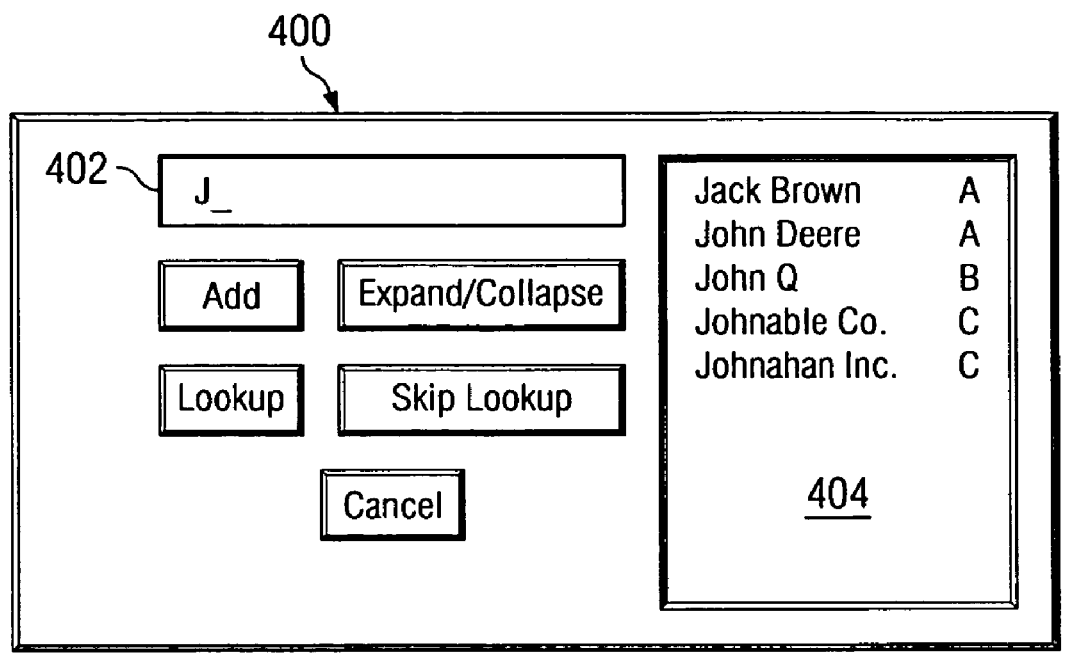
FIGS. 6A & 6B illustrate a hypothetical application of the present invention to a fictional data source.
Figure 6B:
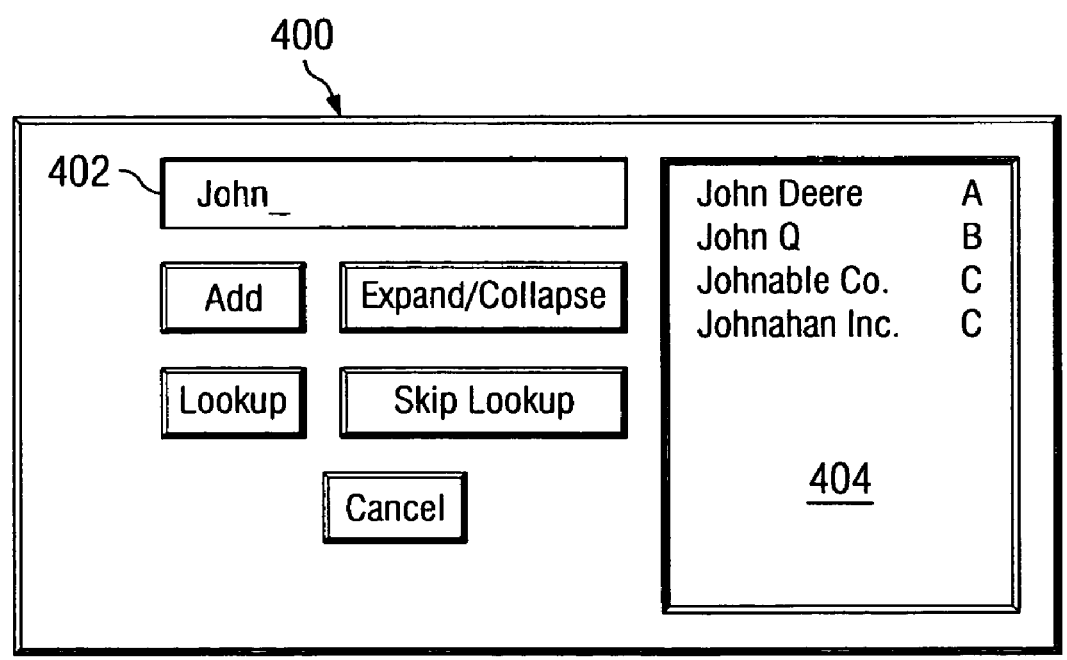

FIGS. 5, 6A, and 6B illustrate these inventive aspects further by demonstrating the practical application of buddy list lookup program 200 to a specific, but fictional, buddy list. Fictional buddy list 500 is presented as a table in FIG. 5. In fictional buddy list 500, each entry is represented as a row comprised of three fields: a "User Name," a "Real Name," and a "Group." In this hypothetical example, the user occasionally collaborates with another user named John Q, and wants to make sure John Q is included in buddy list 500. So, the user starts buddy list lookup program 200 and sees GUI 400 (see FIG. 4). The user then enters the character "j" in text entry field 402, as illustrated in FIG. 6A. Query program 210 then builds a result set consisting of all entries in fictional buddy list 500 that begin with the letter "j." The user can set preferences that determine which field query program 210 examines, but in this example the results are extracted from the Real Name field. Thus, the result set in this example consists of "Jack Brown," "John Deere," "John Q." "Johnable Co.," and "Johnahan Inc.," along with their respective Group information. This result set is displayed as in FIG. 6A. Of course, in this limited example the user probably could examine this result set and see that John Q already is included in buddy list 500. But to illustrate the operation of buddy list lookup program 200, the user enters the additional characters "o," "h," and "n" in text entry field 402, as illustrated in FIG. 6B, to refine the result set. Query program 210 then builds a new result set consisting only of "John Deere," "John Q." "Johnable Co.," and "Johnahan Inc." The user then can readily examine this limited result set and see that John Q is already in buddy list 500 in Group B. Thus, the user can avoid inadvertently duplicating this entry in buddy list 500. Of course, the user can consciously choose to duplicate the entry or add John Q to another Group.

Buddy list lookup program 200 may be integrated with existing IM tools, such as those that allow a user to add entries to a buddy list manually, or that allow a user to look up entries from a central location and add them to a buddy list. Such tools commonly already have text entry field, along with command buttons for activating these functions. Such common command buttons are illustrated in FIG. 4, labeled as an "Add" command button, a "Lookup" command button, and a "Skip Lookup" command button. In such an embodiment, a new button labeled "Expand/Collapse" or something similar would be added to the existing interface, which when activated would expand the window to include the result field. As the user enters characters in the text entry field, buddy list lookup program 200 displays the partial matches in the result field. If desired, the user then can select any of the entries from the result field, and buddy list lookup program 200 would automatically enter the complete entry into the text entry field and activate the "Skip Lookup" command button, since buddy list lookup program 200 has already performed the lookup.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer program product for performing a method of displaying one or more entries from a buddy list, the computer program product comprising:
   a computer-readable storage device;
   first program instructions for determining whether an individual is included in the buddy list by displaying a graphical user interface and configuring a search preference for a set of fields of the buddy list, wherein the set of fields comprises a user name field, a real name field, and a group name field;
   second program instructions for receiving a first input in a text entry field of the graphical user interface, wherein the first input comprises a letter of the alphabet from either a user name, a real name, or a group name of the individual, and wherein a first pause follows the input;
   third program instructions for displaying, responsive to the first pause, a result set in a result field of the graphical user interface, the result set comprising all entries from the set of fields that contain the letter of the alphabet;
   fourth program instructions for displaying, responsive to a second input of a plurality of additional letters of the alphabet, a revised result set each time one of the plurality of additional letters is input followed by a corresponding pause, wherein each revised result set contains only those entries from the set of fields that contain the letter and one or more of the additional letters;

fifth program instructions for identifying the individual from the entries in the result set, wherein a determination that the individual is in the buddy list is enabled by a partial entry of the user name, the real name, or the group name of the individual; and sixth program instructions for automatically, responsive to a selection of an entry from the result set, displaying the entry from the result set in the text entry field and activating a skip lookup control on the graphical user interface;

wherein the first through the sixth program instructions are stored in the computer readable storage device.

2. A system comprising:

a processor connected to a computer readable memory, to a computer readable storage device, and to a display device;

a buddy list in the computer readable storage device, wherein the buddy list has a set of fields; and first program instructions for configuring a search preference for a set of fields of the buddy list to be used in performing a search, wherein the set of fields comprises a user name field, a real name field, and a group name field;

second program instructions for displaying a user interface having a text entry field and a result field;

third program instructions for receiving a partial input in the text entry field, wherein the partial input comprises a letter of the alphabet from either a user name, a real name, or group name of the individual;

fourth program instructions for displaying, responsive to receiving the partial input and to a first pause following the partial input, a result set in the result field of the graphical user interface, the result set comprising all entries from the buddy list having the letter of the alphabet in any of the set of fields configured by the search preference; and fifth program instructions for displaying, responsive to an input of a plurality of additional letters of the alphabet, a revised result set each time one of the plurality of additional letters is input followed by a corresponding pause, wherein each revised result set contains only those entries from the set of fields that contain the letter and one or more of the additional letters;

sixth program instructions for identifying the individual from the entries in the result set, wherein a determination that the individual is in the buddy list is enabled by a partial entry of the user name, the real name, or the group name of the individual; and seventh program instructions for automatically, responsive to a selection of an entry from the result set, displaying the entry from the result set in the text entry field and activating a skip lookup control on the graphical user interface;

wherein the first through the seventh program instructions are stored in the computer readable storage device for running via the computer readable memory.

3. A method of providing a list of entries from a buddy list in a computer having a graphical user interface, a display and a selection device, the method comprising:

configuring a search preference for a set of fields of the buddy list to be used in performing a search by a partial input, wherein the set of fields comprises a user name field, a real name field, and a group name field;

displaying a text entry field;

displaying a result field;

receiving a partial input signal indicating the entry of one or more characters in the text entry field, wherein the partial input comprises a letter of the alphabet from either a user name, a real name, or a group name of the individual; and responsive to the partial input and to a first pause following the partial input, performing a search of the buddy list and displaying in the result field all entries from the set of fields that contain the letter of the alphabet;

responsive to an input of a plurality of additional letters of the alphabet, displaying a revised result set each time one of the plurality of additional letters is input followed by a corresponding pause, wherein each revised result set contains only those entries from the set of fields that contain the letter and one or more of the additional letters;

identifying the individual from the entries in the result set, wherein a determination that the individual is in the buddy list is enabled by a partial entry of the user name, the real name, or the group name of the individual and responsive to a selection of an entry from the result set, automatically displaying the entry from the result set in the text entry field and automatically activating a skip lookup control on the graphical user interface.

* * * * *